(12) United States Patent
Vázquez-Pérez

(10) Patent No.: US 6,516,501 B2
(45) Date of Patent: Feb. 11, 2003

(54) METHOD AND APPARATUS FOR ECOLOGICAL BURIAL

(76) Inventor: José Fernando Vázquez-Pérez, 6 Jofre St., Apt. 8-A, San Juan, PR (US) 00907

( * ) Notice: Subject to any disclaimer, the term of this patent is extended or adjusted under 35 U.S.C. 154(b) by 0 days.

(21) Appl. No.: 09/919,660

(22) Filed: Jul. 31, 2001

(65) Prior Publication Data

US 2002/0032954 A1 Mar. 21, 2002

Related U.S. Application Data

(60) Provisional application No. 60/221,900, filed on Jul. 31, 2000.

(51) Int. Cl.$^7$ .............................................. A61G 17/00
(52) U.S. Cl. ............................................................ 27/1
(58) Field of Search ........................... 27/1; 47/14, 74, 47/33, 17; D99/17; 220/23.87

(56) References Cited

U.S. PATENT DOCUMENTS

| | | | |
|---|---|---|---|
| 2,812,102 A | * 11/1957 | Caplinger | ................... 220/324 |
| 3,923,729 A | * 12/1975 | Clendinning | .................... 47/74 |
| 4,199,848 A | 4/1980 | Kohnert | |
| 5,636,418 A | 6/1997 | Vail | |
| 5,701,642 A | 12/1997 | Order | |
| 5,774,958 A | 7/1998 | Casimir | |
| 5,799,488 A | * 9/1998 | Truong | ..................... 47/1.01 R |
| 5,815,897 A | * 10/1998 | Longstreth | ........................ 27/1 |
| 6,092,330 A | * 7/2000 | Pratt | ........................... 47/41.1 |

FOREIGN PATENT DOCUMENTS

JP          2001245941 A   *   9/2001

* cited by examiner

*Primary Examiner*—William Miller
(74) *Attorney, Agent, or Firm*—Torres Oyola Law Offices, P.S.C.; Eugenio J. Torres

(57) ABSTRACT

An urn which comprises a series of pod-like containers made of compressed organic matter, porcelain, and glass, designed to function as cinerary urns (i.e. receptacles for human ashes) is disclosed. The urn is meant to interact with its surroundings by dissolving into it, and eventually producing a living monument, in the form of a tree, or a plant, in memory of the deceased person whose ashes it contains.

12 Claims, 10 Drawing Sheets

METHOD AND APPARATUS FOR ECOLOGICAL BURIAL

RELATED APPLICATIONS

This application claims the benefit of the filing date of provisional application Ser. No. 60/221,900, filed Jul. 31, 2000, the entire disclosure of which is incorporated by reference herein as if fully set forth in its entirety.

STATEMENT REGARDING FEDERALLY SPONSORED RESEARCH AND DEVELOPMENT N/A

BACKGROUND OF THE INVENTION

1. Field of the Invention

The present invention relates generally to urns used for burying or preserving the remains of humans and animals and, more specifically, to a crematory urn for disposing of the cremated remains of a deceased person or animal in a dignified manner leaving a tree or a plant as a living monument to said person or animal.

2. Discussion of the Background

Present day burial practices include those which consist of the fixation of the deceased with toxic chemicals. The body is then contained in a coffin (usually wood or metal) and placed in the ground with a metal, stone, or other commemorative symbol over the grave site. This leads to the use of land sites as cemeteries which are unattractive to the community. Further, the preservation of the body is not consistent with a return of human composition to the natural elements of the world. Methods and apparatus for the dignified handling and burial of human remains have a long history of development, and people worldwide have evolved a variety of rituals and processes to fulfill these solemn tasks. One universal element in virtually all approaches to interment is a desire for a high degree of permanence in the processes invoked.

Cremation of both human and animal remains also has a long history of usage in many cultures, and is recently becoming the process of choice for an increasingly large number of societies. Many factors are contributing to the recent shift away from conventional grave-site burials towards cremation, not the least of which are practical considerations. However, given the high cultural importance of burials, the primary humanitarian criteria for interment have always, and most likely will continue to prevail. These are: a universal desire for dignified handling of the deceased; a desire for permanence in the disposition of the resulting remains; and, oftentimes, a preference for a specific location for the final resting place of the remains.

Cremation is used extensively today as an alternative to burial or entombment of a deceased person or animal. Cremation is generally less expensive than the more established burial practices and involves fewer ecological and land use problems. In addition, cremated remains can be more easily stored at a repository located in a home or church and if necessary can be easily transferred to another repository. The cremation remains, also commonly referred to as the cremation ashes or cremains are placed in the urn after cremation of the body has taken place. The ashes are either then permanently stored in said urn and buried or stored within mausoleums or elsewhere. Sometimes the urn is taken out to sea and thrown overboard or opened and the ashes sprinkled upon the sea.

Cremation urns traditionally have comprised a decorative body containing a chamber for housing the cremated remains of the deceased. Several attributes and characteristics are typically desired from burial urns. The first desirable attribute is the presence of an outer surface which provides an aesthetically pleasing appearance, thereby making the burial urn suitable for the religious ceremonies that frequently accompany the passing of the deceased. Second, the burial urn preferably is constructed in such a manner so as to effectively protect the urn's contents from external forces that are often imparted thereon. For example, the burial urn generally must be capable of withstanding deterioration and erosion that can be caused by moisture. In addition, generally it is desirable that the burial urn be impervious to rupture in case the urn is accidentally struck.

Various types of cremation urns are available, including an urn that dissolves when submersed in water (Casimir, U.S. Pat. No. 5,774,958), an environmentally degradable urn for burial of human cremation ashes in cemeteries (Vail, U.S. Pat. No. 5,636,418), and a burial urn for displaying a memorial in shape of a book (Kohnert, U.S. Pat. No. 4,199,848). In addition, U.S. Pat. No. 5,701,642 to Order discloses an ecological burial method and apparatus where a tree is planted above a biodegradable coffin structure so that when the coffin structure biodegrades the nutrient or fertilizer, or combinations thereof, are capable of being supplied to the tree to create an ecologically sound environment. None of these devices or methods in the prior art, however, provides a crematory urn, with an associated burial method, which provides a dignified manner of disposing of the cremains while at the same time taking advantage of the cremation option and leaving a living monument to the deceased. Thus, there is a need for a cremation urn and burial method which overcomes these and other deficiencies in the prior art.

SUMMARY OF THE INVENTION

The object of the present invention is to provide a dignified manner of disposing of the cremated remains of the deceased.

It is a further object of the present invention to reconsider the traditional tendencies of burial and monumentalization as practiced within the classic "cemetery-entombment" tradition, and to provide a humane and ecologically sound alternative to the modern funeral practice.

It is another object of the present invention to provide a burial urn that provides an aesthetically pleasing outer appearance.

It is a further object of the present invention to provide a burial urn constructed from an inexpensive material.

It is an object of the urn of the present invention to provide a burial urn made of a material which will facilitate an easy fragmentation under compression thus enabling a tree or plant to grow from within.

It is another object of the present invention to provide a burial urn made from materials which are preferably all environmentally safe so that they will not pollute the environment.

It is another object of the present invention to provide an alternative burial method that saves cemetery space, preserves land, and is economical.

The urn itself, both as to its construction and its mode of operation, will be best understood, and additional objects and advantages thereof will become apparent, by the following detailed description of a preferred embodiment taken in conjunction with the accompanying drawings.

When the word "invention" is used in this specification, the word "invention" includes "inventions", that is, the plural of "invention". By stating "invention", the Applicant does not in any way admit that the present application does not include more than one patentably and non-obviously distinct invention, and Applicant maintains that the present application may include more than one patentably and non-obviously distinct invention. The Applicant hereby asserts, that the disclosure of the present application may include more than one invention, and, in the event that there is more than one invention, that these inventions may be patentable and non-obvious one with respect to the other.

DESCRIPTION OF THE PREFERRED EMBODIMENT

Figure 1:
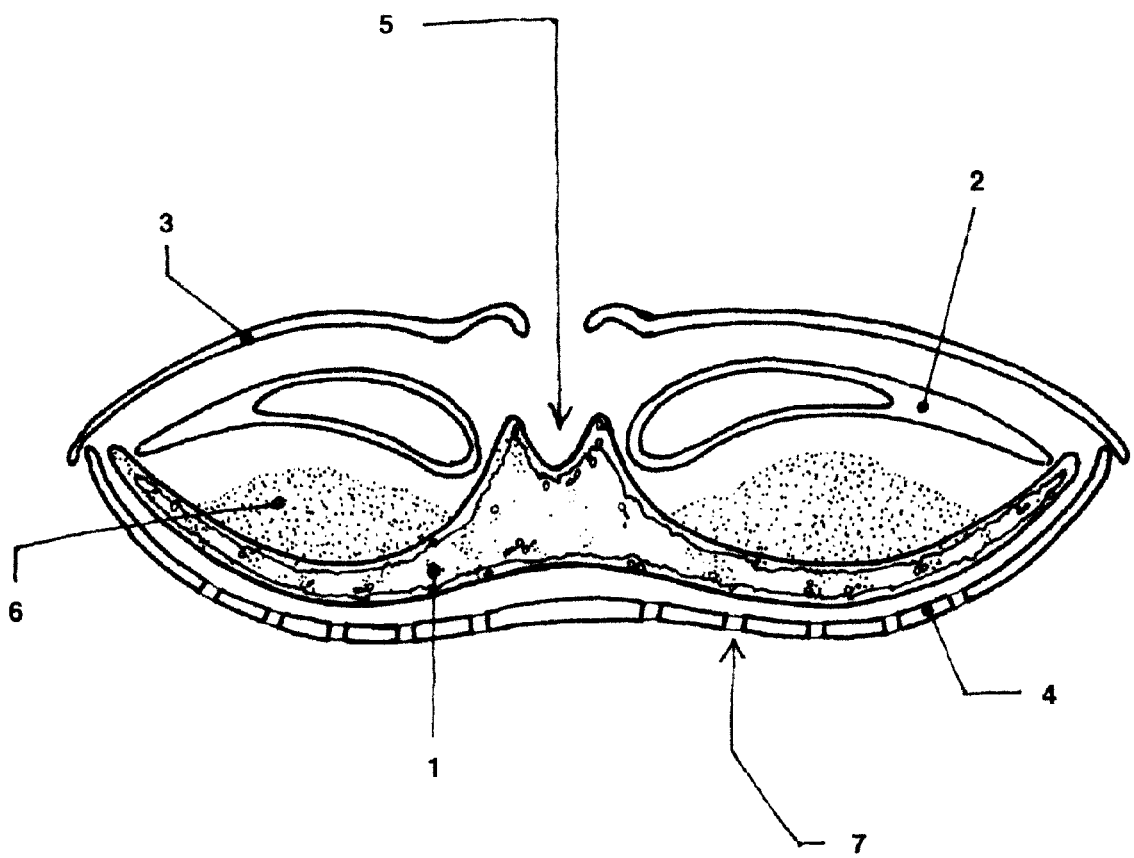
FIG. 1 is a sectional view of the complete urn of the invention, containing human cremains.
Figure 2:
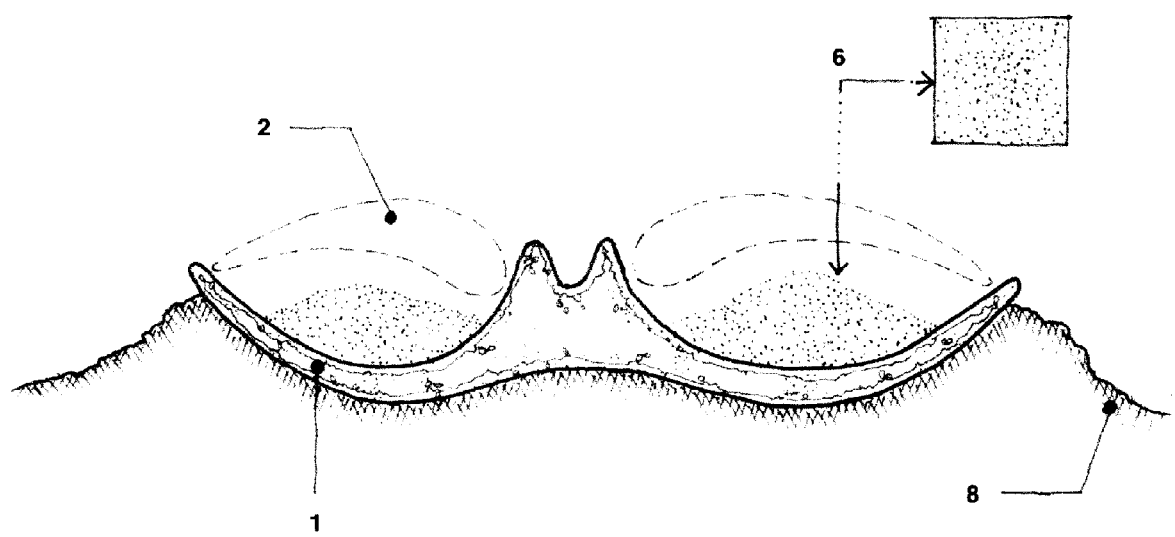
FIG. 2 is a sectional view of earthbound shell, with ashes, and removed top cover.
Figure 3:
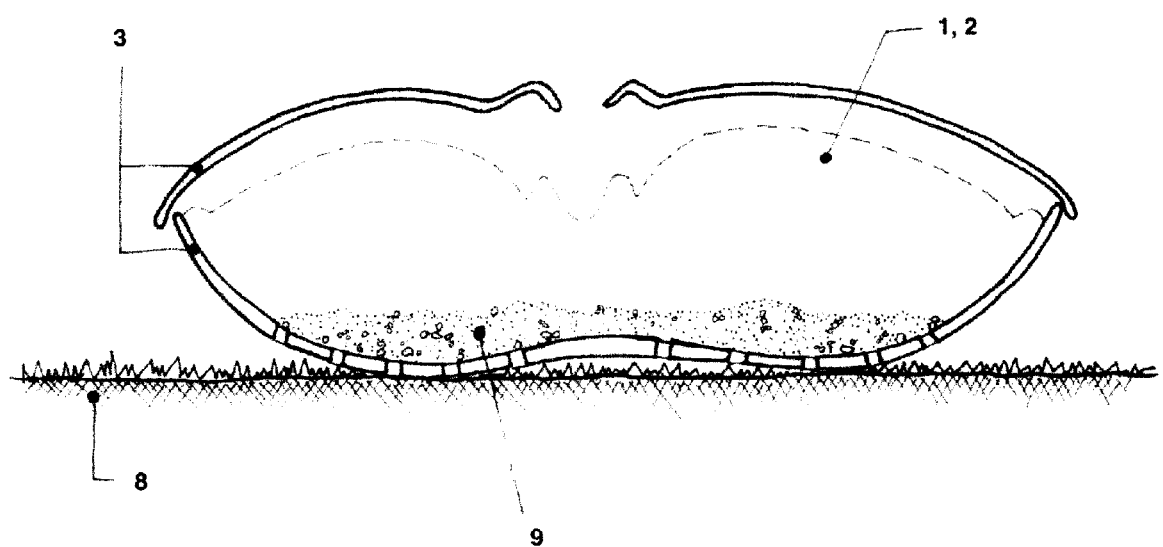
FIG. 3 is a sectional view of glass orb, containing removed earth excess, as keepsake.
Figure 4:
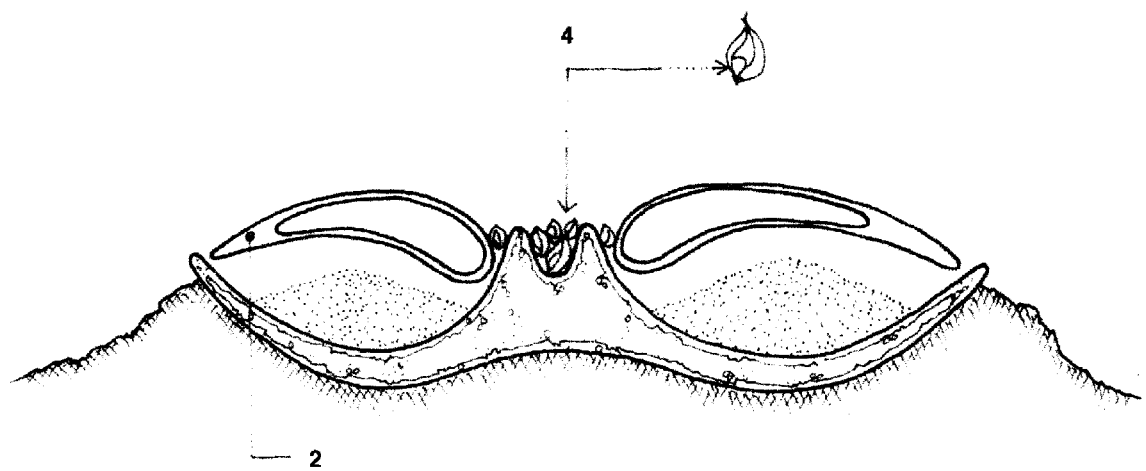
FIG. 4 is a sectional view of earthbound urn, planted with seeds.

The urn as constructed in accordance with the present invention comprises an organic bottom shell 1, a ceramic top cover 2, and an exterior, two-part glass container (top 3 and bottom 4).

The organic bottom shell of the preferred embodiment is of oval shape and is made of an organic matrix of materials composed of compressed peat moss, vermiculite, soil, and crushed wood debris, which is cast into its particular form using aluminum molds, or any other suitable materials. Additionally, the matrix composition can be complemented with various fertilizers, nutrients, or a combination thereof, by adding them into the mixture before being cast into form. This matrix is ideal because it can be formed into a rigid shell, capable of holding its shape and contents until it is exposed to water or the elements in the environment. The concave shell is approximately 16" by 13" and 6" in depth, and is designed to hold the approximate 2 liters of ashes resulting from a regular cremation of a human body. It has a central volcano-like protrusion, with a smaller concavity 5 at its tip, designed to hold plant seeds. The body of this protrusion also serves to secure the ceramic top in place.

The ceramic top cover 2 is made of white argillaceous porcelain clay, cast through regular slip-casting methods using plaster molds. The piece is baked (burned) to a point of medium hardness, to facilitate an easy fragmentation under compression. The slip-casting process is performed evenly to ensure a thin sectional thickness throughout the wall of the form, but especially through the central cavity where the plant will grow, to ensure an easier fragmentation as the tree sprouts (approximately 3–16" to ⅜"). This cover is designed to rest flush on top of the organic shell. Once in place, the urn resembles a giant, two-color oyster with a hole in the center.

The urn is encapsulated within a larger, two-part glass container 3,4, which mimics the shape of its contents, similar to the way a nut is contained within its outer shell. The glass orb also carries over the central hole on the top, and additionally has multiple smaller holes 7 on the bottom. When viewed with the planting urn inside, the complete object is said to resemble an enormous translucent seed. The primary purpose of the external orb is to protect the actual urn before it is used, and during transportation. A secondary function of the glass orb is to serve as a temporary green house for the urn in the case that it is temporarily planted as one complete thing, for eventual relocation.

The urns of the invention are designed to be laid outdoors, on fertile-ground areas that promote the natural growth of plants and trees. Methods of operation of the cemeteries for such urns, including methods of business operation of such cemeteries, are now described which allow the cemeteries to be used for the preservation of flora, fauna, and of ecological systems. Cemeteries exist partially because of the requirements of the living relatives and acquaintances. Such people have a need to visit the marked gravesite of the deceased. In the operation of the funeral rite, the user emulates a process similar to the following:

1. A preferred spot is selected in the desired place of entombment. Once found, a small amount of soil is removed from the earth surface 8 so as to have a natural base on the terrain to accommodate the urn.
2. The glass orb is then placed next to the dug area, and opened to reveal the plant urn. The urn is then removed from its container and placed in the lightly excavated area. It is then opened up itself, by removing the ceramic top cover 2, having only the organic bottom shell 1 facing up. It is then that the cremated remains 6 of the deceased are to be placed in it, spread around the shell's central protrusion 5.
3. At this point, the organic bottom shell 1 is covered again with the ceramic top cover 2, perfectly enclosing the cremated remains 6 inside, only revealing the concave tip of its central protrusion 5.
4. The urn is then "impregnated" with the pre-selected seeds 10, by placing them in the central cavity, and then slightly covering them with part of the excess earth that was previously dug out.
5. The rest of the excess soil 9 is meant to be stored and kept in the two-part glass container 3,4, which now serves as a keepsake box. This glass container serves as the only reminder-remainder, of the event.

6. As it is allowed to remain exposed to its new environment and the micro flora and fauna of the soil, the pressed organic amalgam of the urn's organic bottom shell 1 absorbs and retains surrounding moisture, promoting the germination 14 of the contained seeds. The eventual growth of the gestating tree breaks through 12 the central cavity on the ceramic top cover, and as its caliper thickens, the ceramic top cover crushes from the center 13, akin to an egg's shell fracturing to reveal its hatching.

Figure 5:
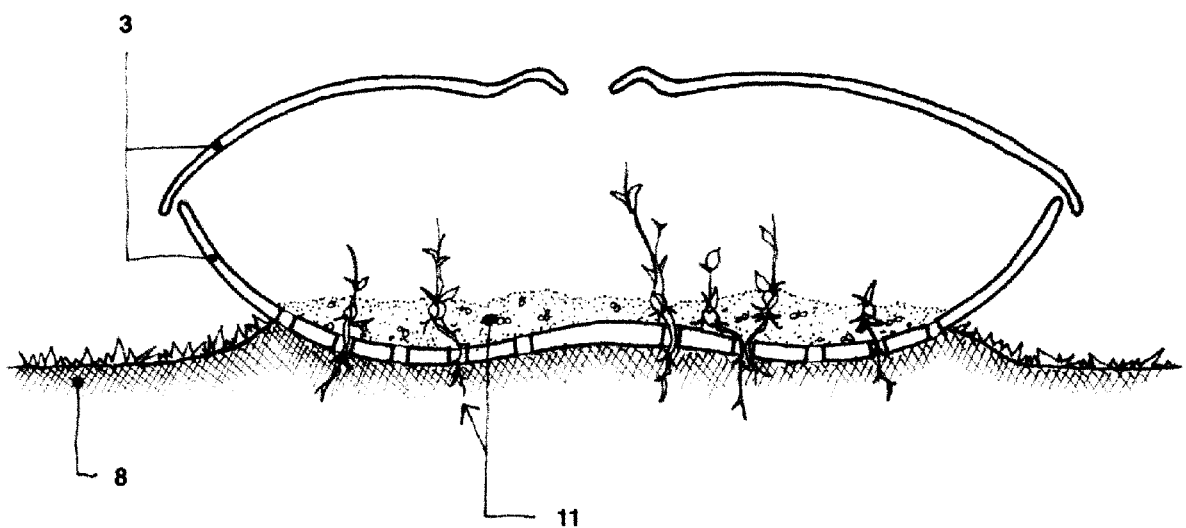
FIG. 5 is a sectional view of glass orb functioning as garden planter or greenhouse.
Figure 6:
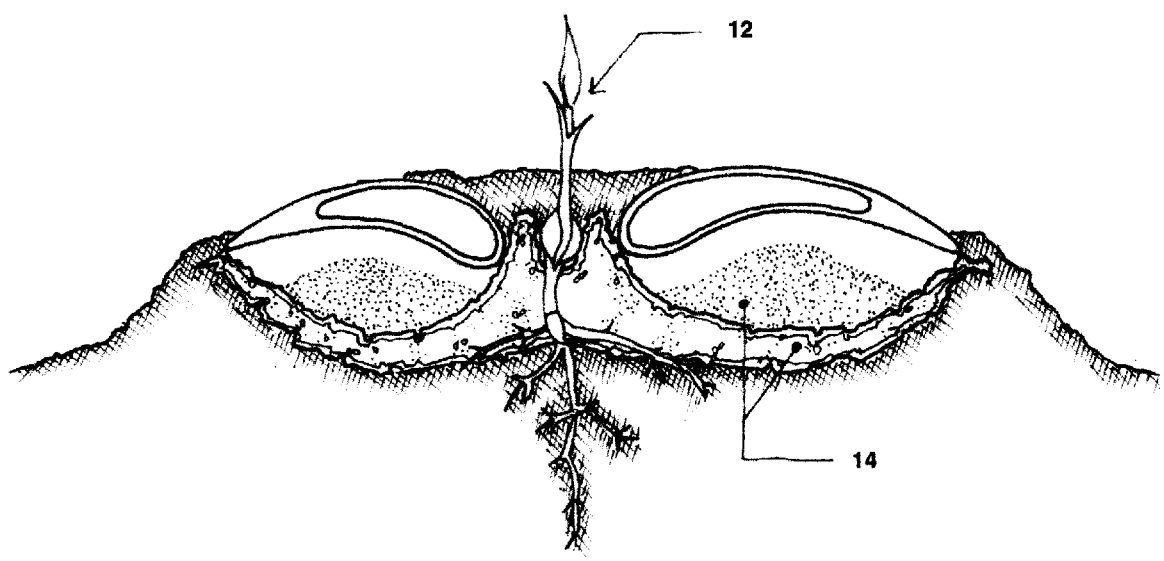
FIG. 6 is a sectional view of earthbound urn, with growing plant.
Figure 7:
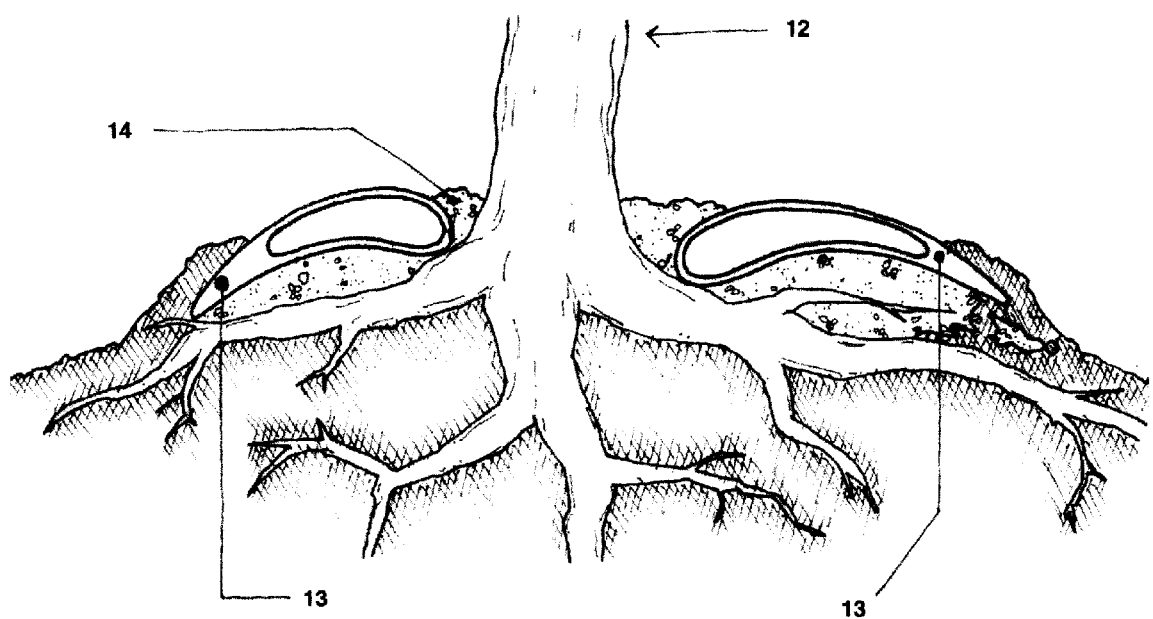
FIG. 7 is a sectional view of broken/disintegrated urn, with grown tree trunk.
Figure 8:
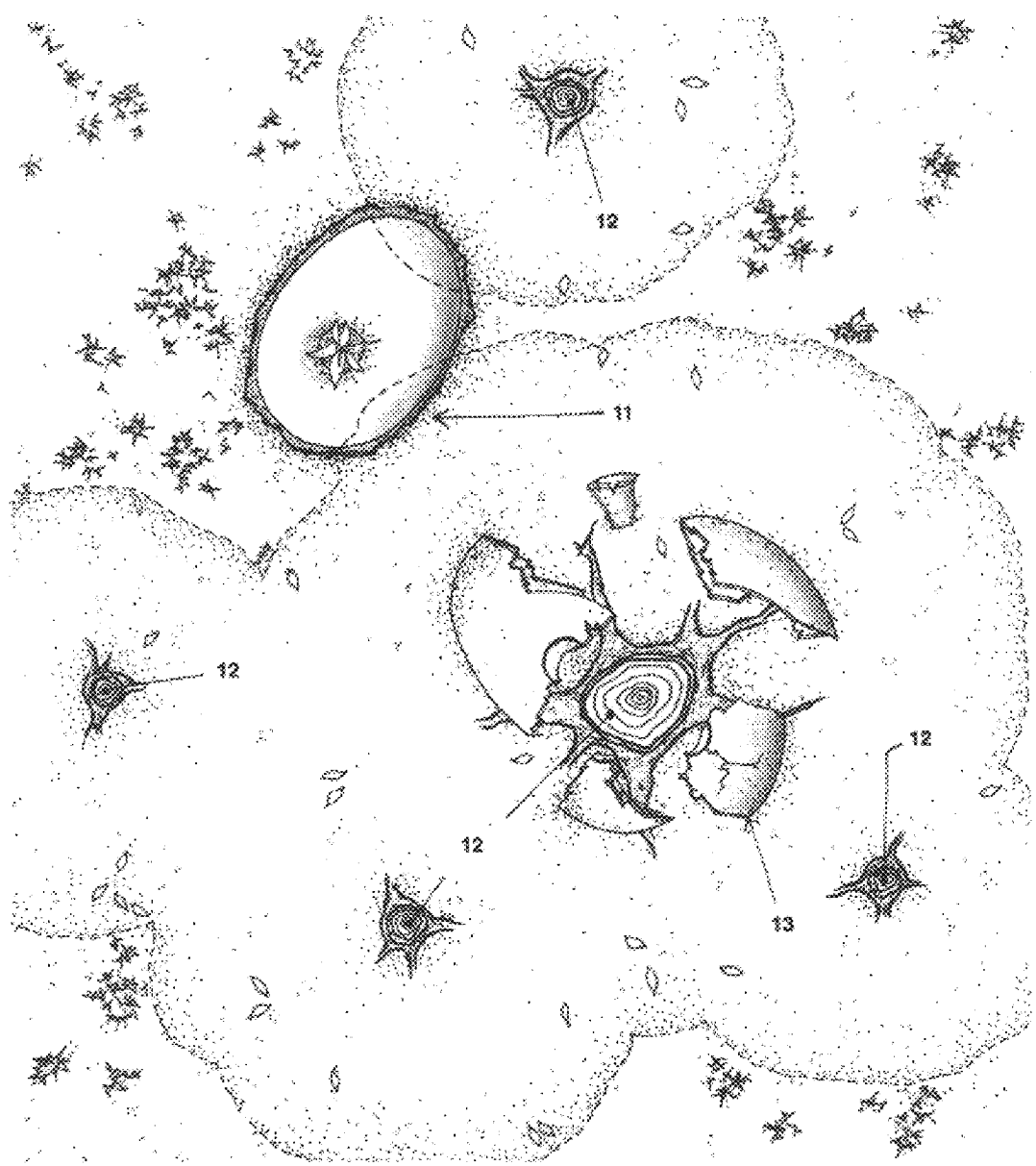
FIG. 8 is a planar view of earthbound urns in their resting environment.
Figure 9:
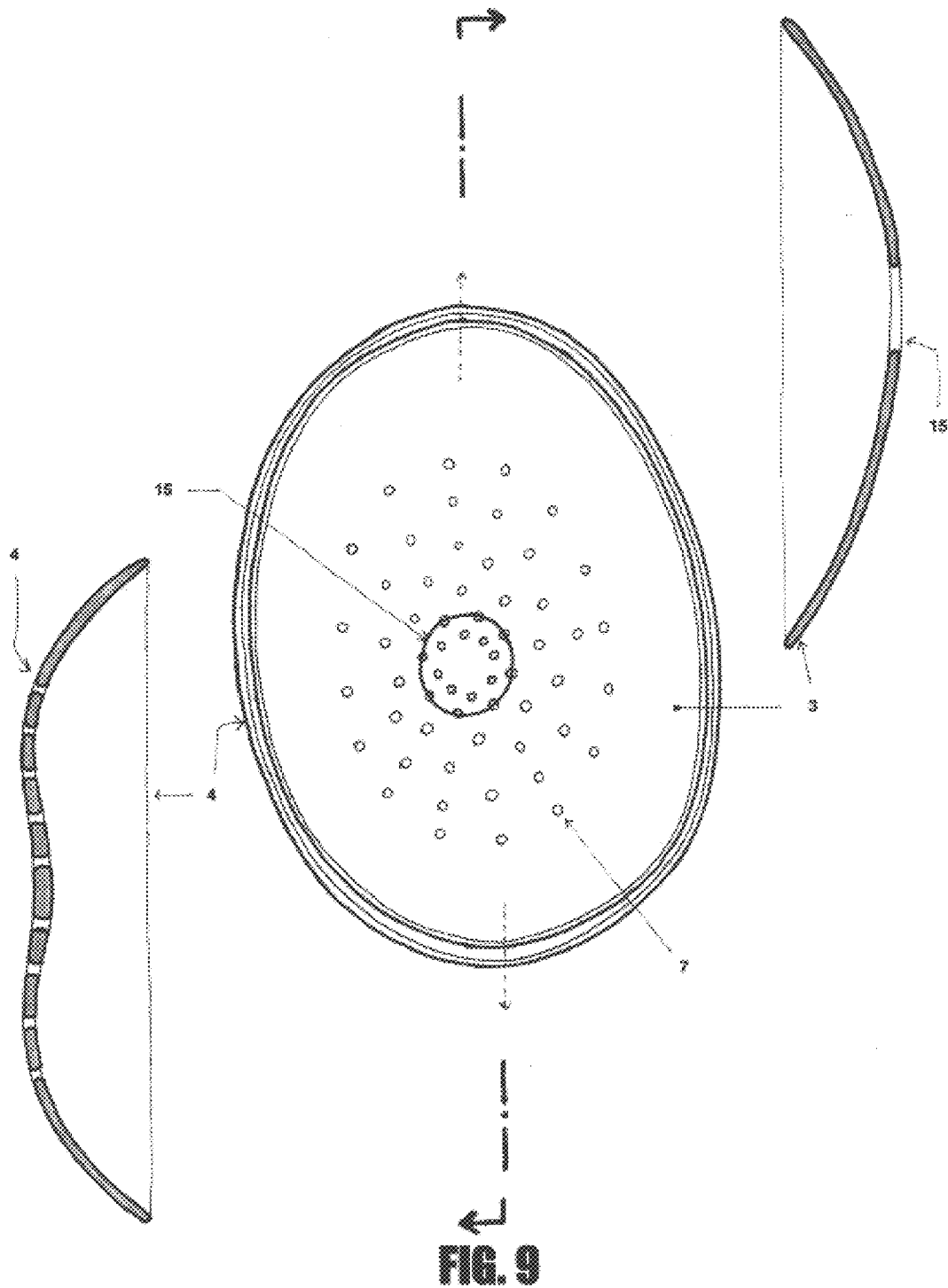
FIG. 9 is a planar and sectional views of empty glass orb.
Figure 10:
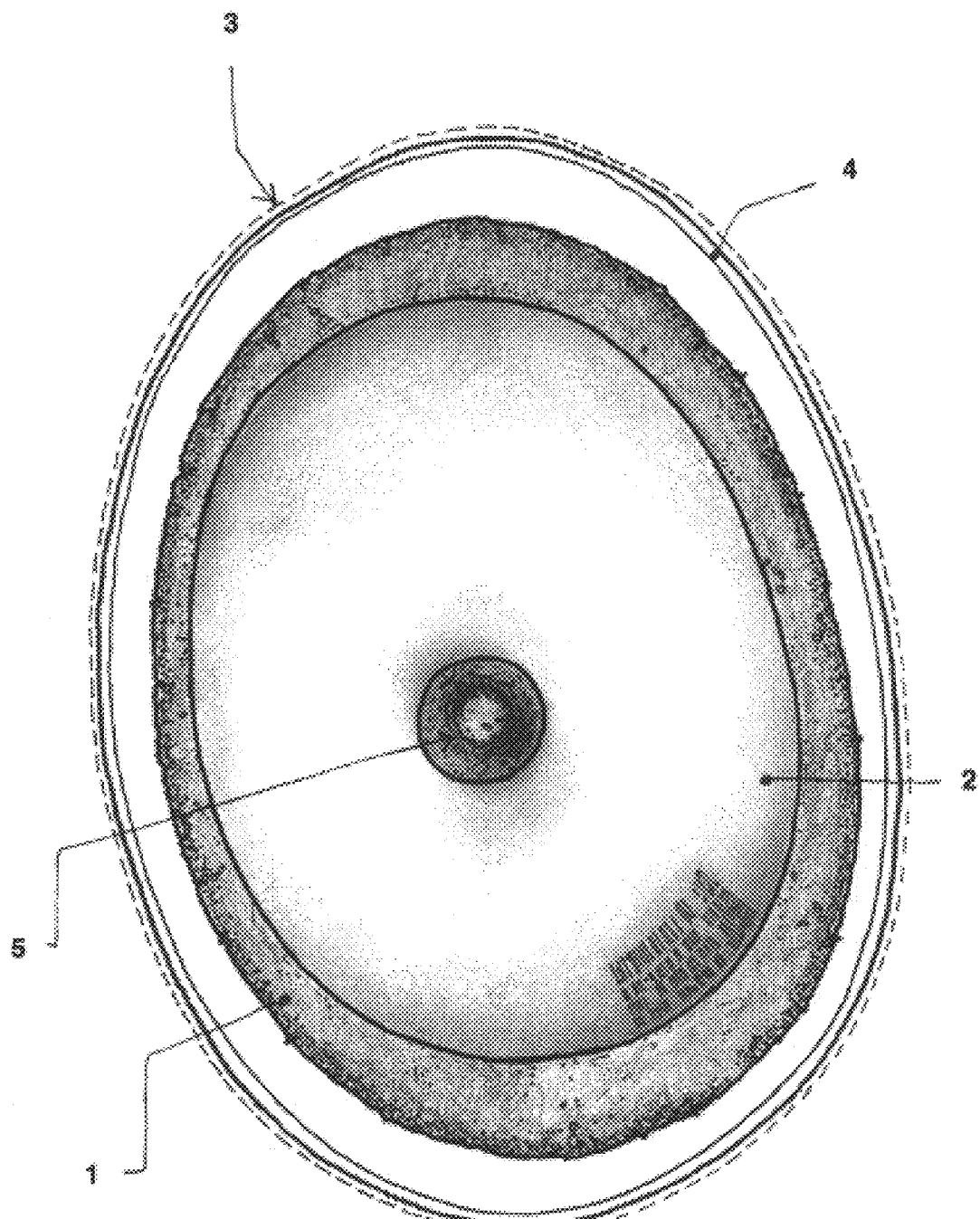
FIG. 10 is a planar view of complete urn of the invention.

7. The two-part glass container eventually can become a garden planter, using its contained soil 11 as the continuum of the planting cycle. Additionally, as shown in FIG. 5, the two-part glass container can also serve as a temporary protective greenhouse, if the urn is initially kept in a domestic environment, for eventual relocation.

The urns of this invention are meant to remind the living of our common mortal existence: our physical origin and destiny in this planet earth, as part of the natural cycle, as a symbol of our ultimate return to mother nature. The urns are conceived to be used in a ceremony that promotes an affirmation of natural continuity, and of the earth.

The eventual creation of a plant-like becomes not only the memento mori, but more optimistically, the ultimate memento vivire. The "formal" source of inspiration of the invention comes from the idea that origin and destiny can possibly be the same place, and thus the emulation of a pregnant belly, the copulation of the shells, as a symbol of reproduction, and the seed of life. The ultimate goal of the urns of the invention is to close the circle between man and nature, life emerging out of another's memory.

The urns of the invention were conceived with no particular plant/seeds in mind, and no special feature promotes the use of specific species over others. Nevertheless, the selection of plants and seeds, and the quantity to be used, shall be determined by a series of factors:

1. Location—Only native species to the particular area of planting should be used.
2. Timing—Planting season should be adequate for selected species, unless planting is to be initiated within a controlled environment (i.e. greenhouse)
3. Preparation—Seeds need to be pre-processed, pre-treated, and ready for planting according to its species and environment, in order to encourage a successful germination.
4. Size—Single seed bulbs, or the combination of a few bulbs with soil, have to fit within a 10 square inch space, which is the approximate area [if volume the cubic inches] of the central cavity on the urn.
5. Preference—When all other considerations allow it, tree species selection can conform to the personal preference of the user.

Thus, there has been shown and described a method and apparatus for ecological burial which fulfills all the objects and advantages sought therefor. The invention is not limited to the precise configuration described above. While the invention has been described as having a preferred design, it is understood that many changes, modifications, variations and other uses and applications of the subject invention will, however, become apparent to those skilled in the art without materially departing from the novel teaching and advantages of this invention after considering this specification together with the accompanying drawings. For example, the particular shapes and proportions of the elements of the urn may be varied as desired. Accordingly, all such changes, modifications, variations and other uses and applications which do not depart from the spirit and scope of the invention are deemed to be covered by this invention as defined in the following claims.

All of the patents recited herein, and in the Declaration attached hereto, are hereby incorporated by reference as if set forth in their entirety herein. The details in such patents may be considered to be incorporable at applicant's option, into the claims during prosecution as further limitations in the claims to patentably distinguish any amended claims from any applied prior art.

What is claimed is:

1. A crematory urn assembly for the disposal of cremated remains, said assembly comprising:
   (a) a crematory urn including an organic bottom shell having a cavity therein capable of holding said cremated remains, said organic bottom shell being made from an organic matrix of materials;
   (b) said urn further including a top cover having a central cavity, said top cover designed to rest on top of said organic bottom shell;
   (c) an exterior two-part glass container, having a top and a bottom part, wherein said organic bottom shell and the top cover are placed inside the bottom part of the glass container and are covered with the top part of the glass container, said top part extending over the top cover such that the top part extends over the central cavity of the top cover, said bottom part having a plurality of small drainage holes.

2. The assembly of claim 1, wherein said top cover is made of ceramic.

3. The assembly of claim 2, wherein said organic bottom shell if of oval shape.

4. The assembly of claim 3, wherein said organic matrix of materials comprises: compressed peat moss, vermiculite, soil, and crushed wood debris.

5. The assembly of claim 4, wherein said organic matrix of materials further comprises a plurality of fertilizers.

6. The assembly of claim 5, wherein said organic matrix of materials further comprises a plurality of nutrients.

7. The assembly of claim 6, wherein said organic bottom shell further comprises a central protrusion, said central protrusion having a smaller concavity at its tip, said smaller concavity designed to hold seeds.

8. The assembly of claim 7, wherein said top cover is made of white argillaceous porcelain clay.

9. The assembly of claim 8, wherein said top cover is baked to a point of medium hardness so as to facilitate an easy fragmentation under compression.

10. The assembly of claim 9, wherein said top cover has a thin sectional thickness throughout its wall and said central cavity.

11. A method of using the assembly of claim 7 for the dignified entombment of said cremated remains, comprising the steps of:
   (a) choosing a particular terrestrial location for said dignified entombment;

(b) removing a small amount of soil from the earth surface at said particular terrestrial location creating a dug area so as to have a natural base on the terrain to accommodate said crematory urn in the dug area;

(c) placing said two-part glass container next to said dug area, said two-part glass container being opened to reveal the urn;

(d) removing said urn from said exterior two-part glass container, said urn being placed in said dug area;

(e) opening said urn by removing said top cover, having only said organic bottom shell facing up;

(f) placing said cremated remains in said organic bottom shell, said cremated remains being spread around said organic bottom shell's said central protrusion;

(g) covering said organic bottom shell with said top cover, said cremated remains being enclosed inside, and said central protrusion's concave tip remaining unenclosed;

(h) impregnating said crematory urn with seeds, said seeds being placed in said central cavity;

(i) slightly covering said seeds with part of the excess soil that was previously dug out;

(j) storing said excess soil in said two-part glass container;

(k) allowing said organic bottom shell to absorb and retain surrounding moisture so as to promote the germination of said seeds so that the eventual growth of the gestating tree breaks through said central cavity on said top cover, said top cover being crushed as the tree's caliper thickens;

(l) using said two-part glass container as a garden planter by using said excess soil as the continuum of the planting cycle.

12. The method of claim 11 additionally comprising using said two-part glass container as a temporary protective greenhouse when said crematory urn is initially kept in a domestic environment for eventual relocation.

* * * * *